July 23, 1963  M. J. SOULIGNEY  3,098,916
UNIVERSAL SEALING ELECTRODE
Filed Jan. 8, 1960  3 Sheets-Sheet 1

INVENTOR.
MITCHEL J. SOULIGNEY
BY
Walter Patanoha, Jr.
ATTORNEY

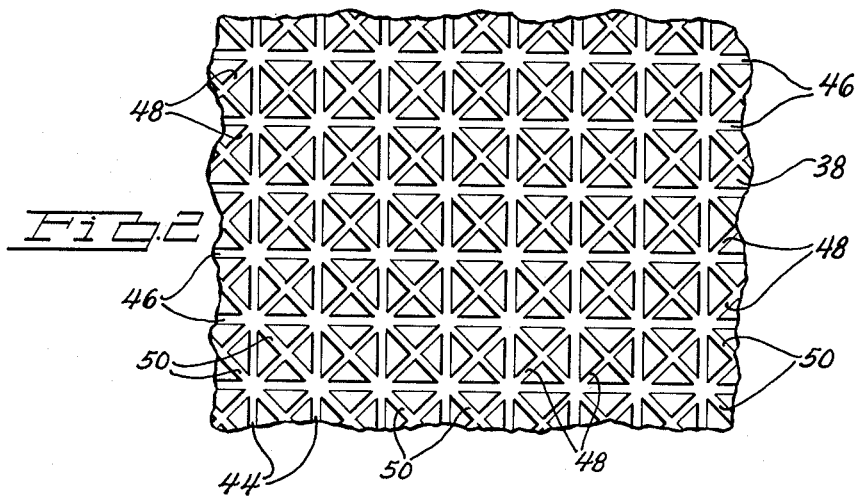
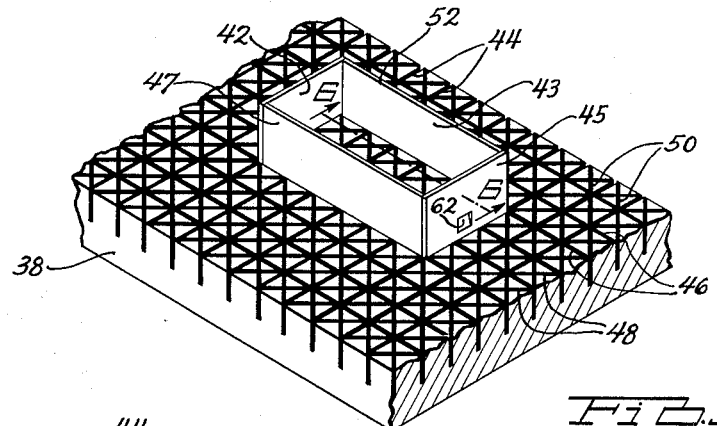
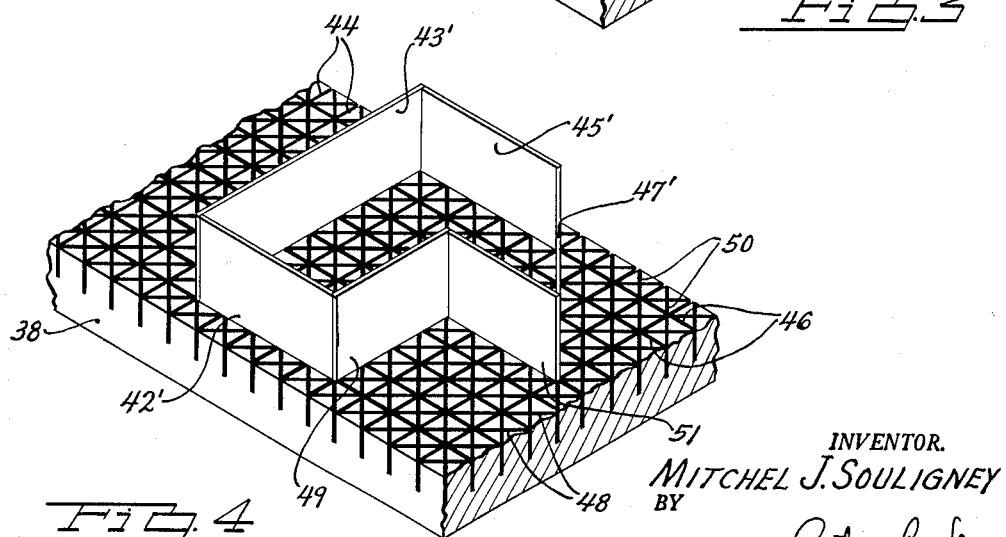

July 23, 1963 M. J. SOULIGNEY 3,098,916
UNIVERSAL SEALING ELECTRODE
Filed Jan. 8, 1960 3 Sheets-Sheet 3

INVENTOR.
MITCHEL J. SOULIGNEY
BY
Walter Patoraho, Jr.
ATTORNEY 2,098,916
Patented July 23, 1963

3,098,916
UNIVERSAL SEALING ELECTRODE
Mitchell J. Souligney, Harper Woods, Mich., assignor to Holley Carburetor Company, Van Dyke, Mich., a corporation of Michigan
Filed Jan. 8, 1960, Ser. No. 1,232
1 Claim. (Cl. 219—10.53)

This invention relates generally to welding, and more specifically to means for the welding of thermoplastic materials.

Presently, it is well known to those skilled in the art that the welding of two or more thermoplastic films can be accomplished by the application thereto of heat and/or pressure. While various mechanisms have been proposed for such operations, a high frequency generator used in conjunction with a press mechanism for bringing electrodes into juxtaposition on opposite sides of the thermoplastic film or films for applying the heat and pressure thereto has been found to be most successful.

The presently accepted practice is to fabricate electrodes which closely define the general outer boundaries of the article which is to be sealed within the thermoplastic film. In other words, every time an article having a different size is to be packaged, different sized electrodes must be fabricated. Consequently, the cost of packaging is increased, since the fabrication of electrodes is an expensive process and a rather large inventory of various sized electrodes is required in order to accommodate all the possible products to be packaged.

Accordingly, it is now proposed to provide electrode means which can be adapted to accommodate any sized article without the necessity of having to fabricate additional electrodes.

Other objects and advantages of the invention will become apparent when reference is made to the following detailed description and illustrations wherein:

FIGURE 2 is a fragmentary top plan view of the electrode mounting plate shown by FIGURE 1;

FIGURE 3 is a perspective view of the electrodes shown by FIGURE 1;

FIGURE 4 is a view similar to FIGURE 3, but illustrating a more complex arrangement of electrodes in accordance with the teachings of the invention;

Figure 1:
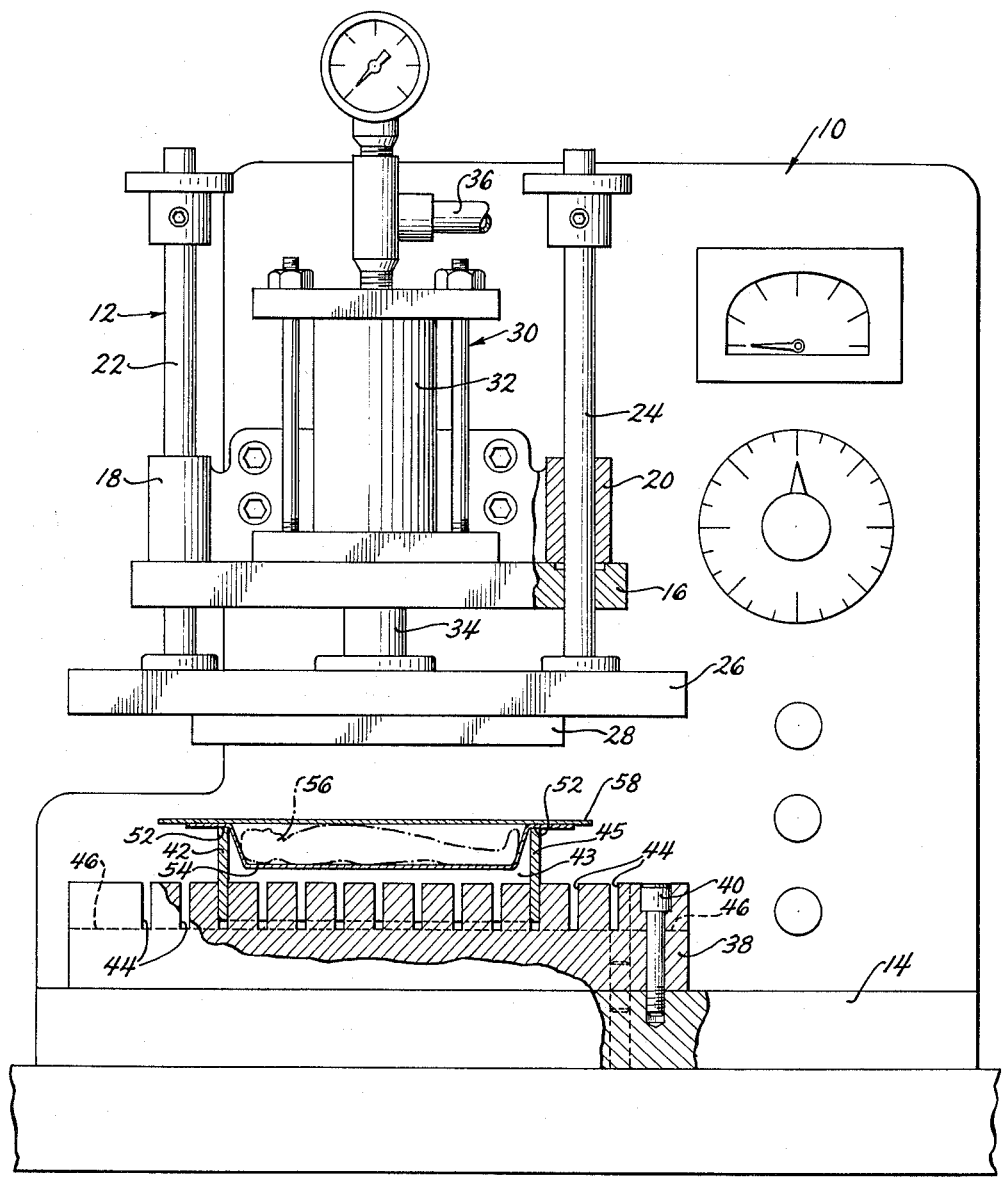
FIGURE 1 is a front elevational view, fragmentarily in cross-section, of a high frequency electric generator equipped with electrodes constructed in accordance with the teachings of the invention.

Referring now in greater detail to the drawings, FIGURE 1 illustrates generally a high frequency electrical generator 10 and a cooperating press mechanism 12, both of which are suitably mounted on a base member 14. The press mechanism 12 may, as illustrated, be comprised of a frame 16 having bushing members 18 and 20 at opposite ends thereof adapted to slidably receive guide pins 22 and 24. An upper plate 26, suitably secured to the guide pins and having an upper electrode 28 mounted thereto, is adapted to travel upwardly and downwardly by the controlled action of a pressure responsive mechanism 30. The mechanism 30 may be comprised of a cylinder 32 having a piston therein adapted to actuate a rod 34 in accordance with the pressure of some actuating fluid directed to the cylinder 32, as by means of conduit 36. The high frequency generator, which is well known to those skilled in the art, will not be described in any detail.

A lower mounting plate 38, having a plurality of formed slots, is adapted to be secured to the base 14 in any suitable manner, as by means of screws 40.

Referring now to FIGURE 3, which illustrates the mounting plate 38 in perspective, it can be seen that a plurality of slots of relatively uniform width are formed therein, the slots being adapted to receive electrode members 42, 43, 45 and 47 therein. Two series of slots 44 and 46 are preferably formed within the member 38 so as to be at generally right angles with respect to each other. All of the slots within each series may, of course, be formed so as to be parallel and spaced at a relatively constant increment with respect to each other.

In addition to the slots 44 and 46, slots 48 and 50 may also be provided. Each series of slots 48 and 50 could, for example, be formed so as to be perpendicular to each other, while at the same time being inclined to the slots 44 and 46 at possibly a 45° angle.

The depth of any or all of the slots 44, 46, 48 and 50 is, of course, a matter of design, and any depth which provides a suitable surface area to retain the electrodes 42, 43, 45 and 47 is adequate.

The electrodes, such as electrode 42 are ideally formed so as to be of a thickness sufficient to result in a slight interference between their surfaces and those of the respective slots. By having their sizes so arranged, it is then possible to press the electrodes into the slots and thereby form "press fits," whereby retention of the electrodes is accomplished. Alternatively, it may be desired to make the thickness of the electrodes substantially less than the width of the slots; if such is the case, then the electrodes can be retained within the slots by any suitable means, such as mechanical locks or wedging shims.

The size of and the geometric pattern formed by the electrodes illustrated in FIGURES 1 and 3 are intended strictly as examples of one possible configuration encompassed within the broad scope of the invention. That is, the lengths and heights of the electrodes could be varied in order to accommodate the size of the particular package to be sealed. FIGURE 4, for example, illustrates how in other cases electrodes 42', 43', 45', 47', 49 and 51 could be formed so as to provide means for sealing rather complex configurations.

After the general outline of the package to be sealed is determined, electrodes of suitable length are placed within the appropriate slots so as to define the desired outline. The electrodes are then pressed into the slots until the outer surfaces 52 of the respective electrodes assume a coplanar position. This may be accomplished by using the upper plate 26 and forcing it downwardly upon the electrodes.

Once the electrodes are in position, the thermoplastic capsule 54 containing some article, such as possibly a toy 56, can be placed within the chamber formed by the electrodes. The thermoplastic material must, of course, extend over the surfaces 52 of the electrodes. Subsequently, a covering sheet 58 of thermoplastic material is placed atop the capsule 54. The upper electrode 28 is then allowed to travel downwardly until it contacts the cover sheet 58 so as to apply a slight pressure to the thermoplastic films held between it and surfaces 52 of the lower electrodes. At this time, the generator 10 is energized and the resulting current flow through the electrodes causes fusion of the thermoplastic films, thereby creating a seal of the same geometric pattern as that of the lower electrodes.

Figure 5:
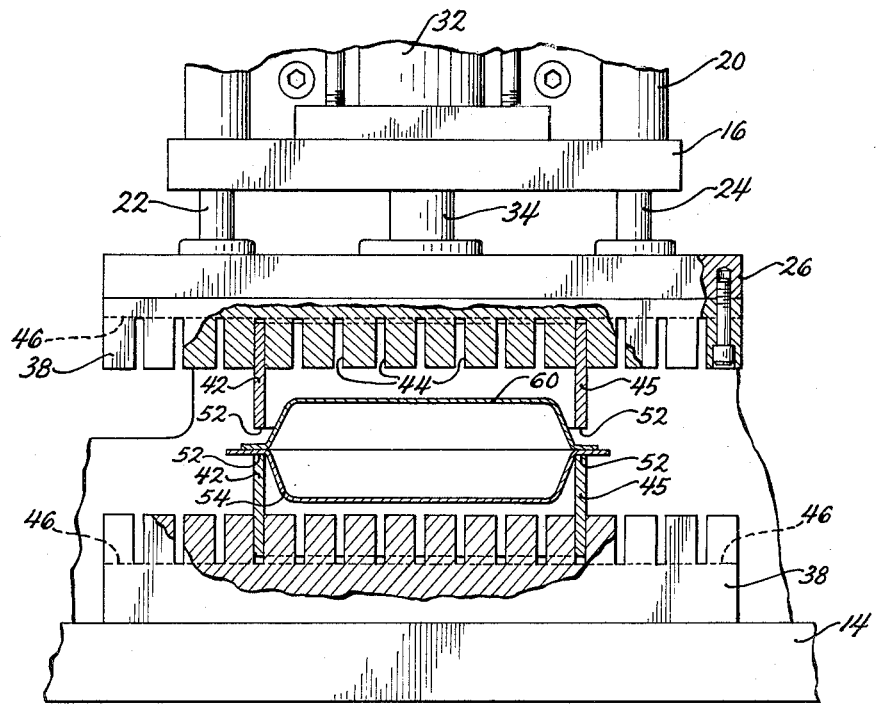
FIGURE 5 is a fragmentary view similar to that of FIGURE 1 showing another embodiment of the invention.

FIGURE 5 illustrates another embodiment of the invention wherein both the lower and upper electrodes are formed in the same manner as the lower electrodes of FIGURE 1. All elements which are alike or similar are identified with like reference numerals. Such an embodiment is particularly suitable where an article is to be packaged in cooperating upper 60 and lower 54 formed thermoplastic capsules.

Figure 6:
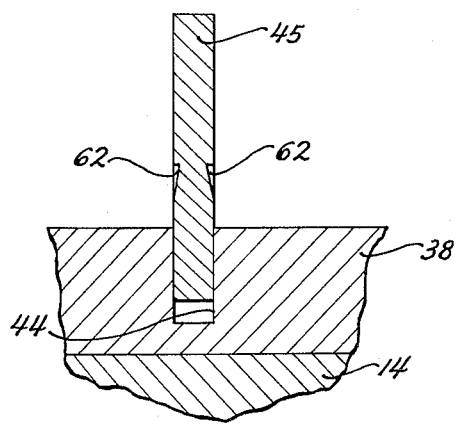
FIGURE 6 is a fragmentary cross-sectional view taken on line 6—6 of FIGURE 3 showing in detail still another possible electrode construction embodying the invention.

FIGURE 6 illustrates a modification of the electrodes wherein means are provided to aid in the removal of the electrodes when a change is required. This can be accomplished by forming a notch or notches 62 within the electrodes so that a tool can be inserted in order to pry the electrode away from the mounting member 38.

From the above, it can be seen that the invention provides a rapid and economized means for constructing electrodes of various sizes and shapes and that the need for expensive forming and welding of special electrodes is completely eliminated.

Although but two embodiments of the invention have been disclosed and described, it is apparent that other modifications of the invention are possible within the scope of the appended claim.

What I claim as my invention is:

An apparatus for sealing thermoplastic films, comprising a base member having an upper surface and a lower mounting surface, a plurality of receiving slots formed in said base member and extending through said upper surface, said slots being so formed as to have the sides thereof substantially perpendicular to the plane of said mounting surface, a plurality of segmented electrode members adapted to be selectively pressed into said receiving slots in a manner so as to form a desired geometric pattern, said plurality of segmented electrode members also being so positioned within said receiving slots so as to cause the respective upper edges of said segmented electrode members to form a second plane substantially parallel to said lower mounting surface, an upper member mounted to suitable means capable of reciprocation, said upper member having an upper mounting surface adapted to be placed in juxtaposition with said reciprocating means, and a lower sealing surface formed on said upper member parallel to said upper mounting surface and said second plane for sealing said thermoplastic films between said respective upper edges of said segmented electrode members and said lower sealing surface.

References Cited in the file of this patent

UNITED STATES PATENTS

| | | |
|---|---|---|
| 1,213,690 | Quinones | Jan. 23, 1917 |
| 1,939,478 | Whistler | Dec. 12, 1933 |
| 1,978,041 | Dodge | Oct. 23, 1934 |
| 2,401,991 | Walton et al. | June 11, 1946 |
| 2,412,982 | Hart | Dec. 24, 1946 |
| 2,621,138 | Messing | Dec. 9, 1952 |
| 2,621,139 | Messing | Dec. 9, 1952 |
| 2,626,494 | Lewis | Jan. 27, 1953 |
| 2,630,519 | Gard | Mar. 3, 1953 |
| 2,649,392 | Marshall | Aug. 18, 1953 |
| 2,666,123 | Blackman | Jan. 12, 1954 |
| 2,734,982 | Gillespie et al. | Feb. 14, 1956 |
| 2,860,555 | Williamson | Nov. 18, 1958 |
| 2,875,563 | Moore | Mar. 3, 1959 |
| 2,991,216 | Ming C. Hsu et al. | July 4, 1961 |
| 3,031,735 | Jepson | May 1, 1962 |
| 3,032,861 | Foster | May 8, 1962 |